US012404892B2

(12) United States Patent
Li et al.

(10) Patent No.: US 12,404,892 B2
(45) Date of Patent: Sep. 2, 2025

(54) FASTENER

(71) Applicant: Illinois Tool Works Inc., Glenview, IL (US)

(72) Inventors: Zhilin Li, Shanghai (CN); Jiahui He, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/605,661

(22) Filed: Mar. 14, 2024

(65) Prior Publication Data

US 2024/0344545 A1 Oct. 17, 2024

(30) Foreign Application Priority Data

Apr. 13, 2023 (CN) .......................... 202310395435.X

(51) Int. Cl.
  *F16B 21/07* (2006.01)
  *F16B 5/06* (2006.01)

(52) U.S. Cl.
  CPC ............ *F16B 21/076* (2013.01); *F16B 5/065* (2013.01)

(58) Field of Classification Search
  CPC ...... F16B 21/076; F16B 5/065; F16B 21/086; F16B 5/00; F16B 5/10
  See application file for complete search history.

(56) References Cited

U.S. PATENT DOCUMENTS

| 6,431,585 B1 * | 8/2002 | Rickabus ............... B60R 21/216 |
| | | 280/730.2 |
| 7,213,378 B2 * | 5/2007 | Randez Perez ..... B60R 13/0206 |
| | | 296/146.7 |
| 8,613,128 B2 | 12/2013 | Moerke |
| 11,384,784 B2 * | 7/2022 | Gokavi .................. F16B 21/075 |
| 11,572,026 B2 * | 2/2023 | Wang .................... F16B 5/0657 |
| 11,608,849 B2 * | 3/2023 | Liebelt .................. F16B 21/075 |

(Continued)

FOREIGN PATENT DOCUMENTS

CN 102597540 B 8/2014

*Primary Examiner* — David M Upchurch
(74) *Attorney, Agent, or Firm* — McAndrews, Held & Malloy, Ltd.

(57) ABSTRACT

The present application provides a fastener for fastening a first component in a second component having a circular hole. The fastener includes a main body and a retaining member. The main body includes a head for connecting the first component and a shaft portion extending from the head. The retaining member includes a receiving barrel and a plurality of retaining arms. The shaft portion passes through and is connected to the receiving barrel to limit the axial and radial movements of the retaining member along the shaft portion relative to the main body. The plurality of retaining arms extend upwardly from the receiving barrel and are distributed about the central axis of the receiving barrel. The plurality of retaining arms are deflectable towards the shaft portion. The plurality of retaining arms are located between the shaft portion and a hole and abut against the hole to retain the second component between the head and the plurality of retaining arms when the retaining member is inserted into the hole. The main body is made of a first material, and the retaining member is made of a second material that is more wear-resistant than the first material.

14 Claims, 8 Drawing Sheets

(56) References Cited

U.S. PATENT DOCUMENTS

| | | | |
|---|---|---|---|
| 11,773,887 B2* | 10/2023 | Dickinson | F16B 5/0657 |
| | | | 24/289 |
| 11,920,623 B2* | 3/2024 | Lee | F16B 21/073 |
| 2014/0050548 A1 | 2/2014 | Loewe | |
| 2014/0341674 A1* | 11/2014 | Hirano | F16B 19/1081 |
| | | | 411/80.1 |
| 2016/0138629 A1* | 5/2016 | Flynn | F16B 13/063 |
| | | | 411/57.1 |
| 2017/0051780 A1* | 2/2017 | Dickinson | F16B 21/076 |
| 2020/0088226 A1* | 3/2020 | Dickinson | F16B 21/075 |
| 2020/0217345 A1* | 7/2020 | Liebelt | B25B 31/005 |
| 2021/0231152 A1* | 7/2021 | Lee | F16B 19/1081 |
| 2021/0239147 A1* | 8/2021 | Gokavi | F16B 21/065 |

* cited by examiner

FASTENER

RELATED APPLICATION

The present application claims the benefit of Chinese Patent Application Nos. 202310395435X, filed Apr. 13, 2023, titled "Fastener," the contents of which are hereby incorporated by reference.

TECHNICAL FIELD

The present application relates to a fastener. Automotive components require fastening techniques that are simple to manufacture and assemble. Further, fastening techniques should above all be reliable and efficient. In order to secure a secondary panel to a primary panel, a fastener may be used, such as a pin and grommet fastener.

Various types of fasteners are used for fastening components. For example, in case of an instrument panel of a vehicle, fasteners may be used to fix together adjacent panels or to secure one or more objects on the panels. One such type of fasteners is usable with holes of different types, sizes, and shapes provided in the components to be secured together. In other words, for such a fastener to fasten the components, at least one of the components is provided with a hole. One of the components is mounted on the fastener and other component having the hole receives the fastener component assembly.

BACKGROUND

When it is necessary to connect two components, such a connection is achieved by using a fastener. For example, during vehicle assembly, vehicle body trim panels and a vehicle frame are connected by using fasteners.

SUMMARY OF THE DISCLOSURE

The present disclosure generally relates to a fastener, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION OF EMBODIMENTS

Figure 1:
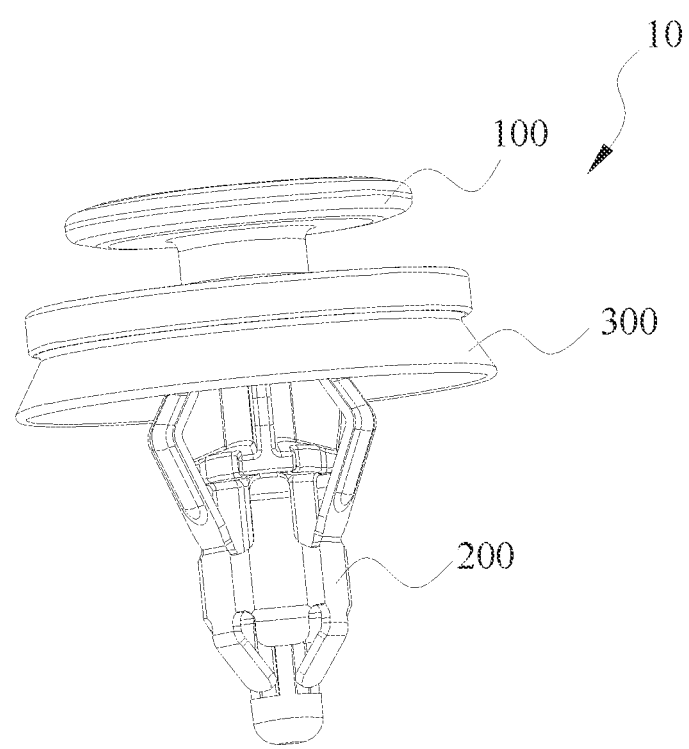
FIG. 1 is a perspective view of a fastener according to an embodiment of the present application.

Various specific embodiments of the present application will be described below with reference to the accompanying drawings which form a part of this description. It should be understood that, where possible, the same or similar reference numerals used in the present application refer to the same components.

Various specific embodiments of the present application will be described below with reference to the accompanying drawings which form a part of this description. It should be understood that although the terms such as "upper", "lower", "inner", "outer" and so on indicating directions are used in the present application to describe various illustrative structural parts and elements in the present application, the terms used herein are merely used for case of description and are determined based on the illustrative orientation shown in the accompanying drawings. Since the embodiments disclosed in the present application may be arranged in different directions, these terms indicating directions are merely illustrative and should not be considered as limitations.

The present application provides a fastener formed by connecting two portions, and the two portions of the fastener can be connected securely. The fastener is capable of securely connecting objects and still maintaining a strong fastening to the connected objects after multiple insertions into and pulls out of the connected objects.

The fastener according to the present application is used for fastening a first component to a second component having a circular hole. The fastener comprises a main body and a retaining member. The main body comprises a head configured to connect the first component and a shaft portion extending from the head. The retaining member comprises a receiving barrel and a plurality of retaining arms. The shaft portion passes through and is connected to the receiving barrel to limit the axial and radial movements of the retaining member along the shaft portion relative to the main body, and the plurality of retaining arms extend upwardly from the receiving barrel, are distributed about the central axis of the receiving barrel and are configured to be deflectable towards the shaft portion, wherein the plurality of retaining arms and the shaft portion are configured such that the plurality of retaining arms are located between the shaft portion and the hole and abut against the hole to retain the second component between the head and the plurality of retaining arms when the retaining member is inserted into the hole. The main body is made of a first material, and the retaining member is made of a second material that is more wear-resistant than the first material.

In the fastener as mentioned above, the first material is plastic, and the second material is metal.

In the fastener as mentioned above, the retaining member is removably mounted on the main body.

In the fastener as mentioned above, the shaft portion comprises a shaft body, and an upper stop structure and a lower stop structure disposed on the shaft body. The upper stop structure is spaced apart from the head by a certain distance, and the lower stop structure is located below the upper stop structure, facing the upper stop structure, and is spaced apart from the upper stop structure by a certain distance. The receiving barrel of the retaining member cooperates with the upper stop structure and the lower stop structure to limit the axial movement of the retaining member along the shaft portion relative to the main body, and the receiving barrel cooperates with the portion of the shaft portion between the upper stop structure and the lower stop structure to limit the radial movement of the retaining member along the shaft portion relative to the main body.

In the fastener as mentioned above, the receiving barrel comprises a barrel body. The outer diameter of the portion of the shaft body (112) received in the barrel body matches the inner diameter of the barrel body.

In the fastener as mentioned above, the receiving barrel further comprises a plurality of upper connecting legs extending from the upper end of the barrel body, the plurality of upper connecting legs are arranged about the central axis of the barrel body, and the plurality of upper connecting legs and the plurality of retaining arms are arranged alternately about the central axis of the barrel body. The shaft portion further comprises a plurality of protrusions arranged about the central axis of the shaft portion and protruding outwardly from the shaft body, and the upper stop structure comprises a plurality of upper stop bosses respectively formed by the plurality of protrusions. The plurality of upper connecting legs respectively abut against the plurality of upper stop bosses.

In the fastener as mentioned above, the receiving barrel further comprises a plurality of lower connecting legs extending from the lower end of the barrel body, and the plurality of lower connecting legs are arranged about the central axis of the barrel body and extend inwardly obliquely towards the central axis of the barrel body. The shaft portion further comprises a plurality of lower recesses arranged about the central axis of the shaft portion and recessed inwardly from the shaft body, and the lower stop structure comprises a plurality of lower stop bosses respectively formed by the plurality of lower recesses. The plurality of lower connecting legs respectively abut against the plurality of lower stop bosses, and the plurality of lower connecting legs are respectively at least partially received by the plurality of lower recesses.

In the fastener as mentioned above, the receiving barrel further comprises a plurality of guiding tabs extending from the lower end of the barrel body, the plurality of guiding tabs are arranged about the central axis of the barrel body and extend inwardly obliquely towards the central axis of the barrel body, and the plurality of guiding tabs and the plurality of lower connecting legs are alternately arranged about the central axis of the barrel body.

In the fastener as mentioned above, the barrel body has a hexagonal cross-section, and the receiving barrel comprises three lower connecting legs, three guiding tabs, three upper connecting legs and three retaining arms, the three lower connecting legs and the three guiding tabs respectively extend downwardly from six sides of the barrel body, and the three upper connecting legs and the three retaining arms respectively extend upwardly from the six sides of the barrel body.

In the fastener as mentioned above, the receiving barrel has a discontinuity enabling the receiving barrel to expand in the radial direction of the receiving barrel.

In the fastener as mentioned above, the shaft portion comprises a plurality of upper ribs located above the upper stop structure, and the plurality of upper ribs are arranged about the central axis of the shaft portion and cooperate with the hole to center the fastener in the hole. The shaft portion further comprises a plurality of receiving recesses formed between adjacent ones of the plurality of upper ribs, and the plurality of receiving recesses are configured to respectively receive the plurality of retaining arms when the plurality of retaining arms are deflected towards the shaft portion.

In the fastener as mentioned above, the plurality of retaining arms have a substantially V shape such that each of the plurality of retaining arms has a lower portion extending obliquely away from the central axis of the barrel body from the barrel body and an upper portion extending obliquely inwardly towards the central axis of the barrel body from the lower portion, and the upper portion has a contact portion for abutting against the hole.

In the fastener as mentioned above, the end of the upper portion is bent outwardly to form a limiting stop retaining the upper portion in the hole.

In the fastener as mentioned above, the plurality of retaining arms have arcuate protrusions on their outer surfaces.

Figure 3:
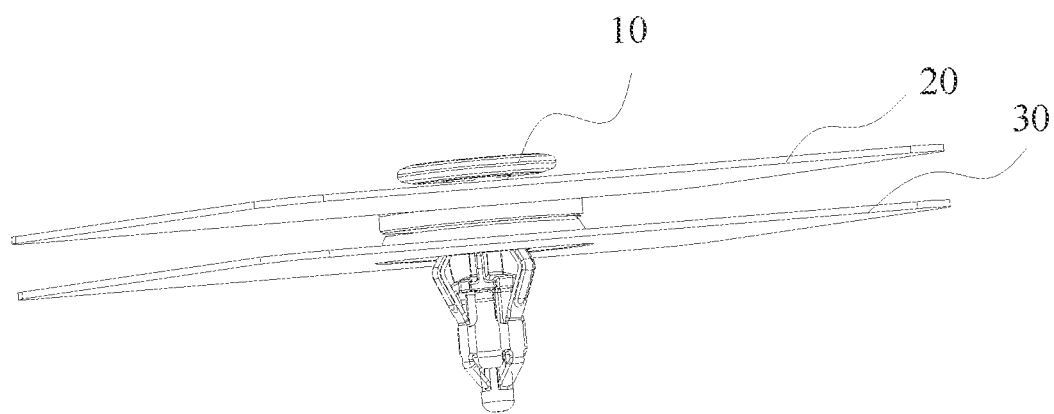
FIG. 3 is a schematic perspective view illustrating the fastener 10 in FIG. 1 connecting a first component and a second component.

A fastener of the present application is used for connecting a first component 20 and a second component 30 (shown in FIG. 3). In some embodiments, the first component 20 is a vehicle body trim panel, and the second component 30 is a vehicle frame. It should be understood that in other embodiments, the first component 20 and the second component 30 are other types of components that need to be connected to each other.

Figure 2:
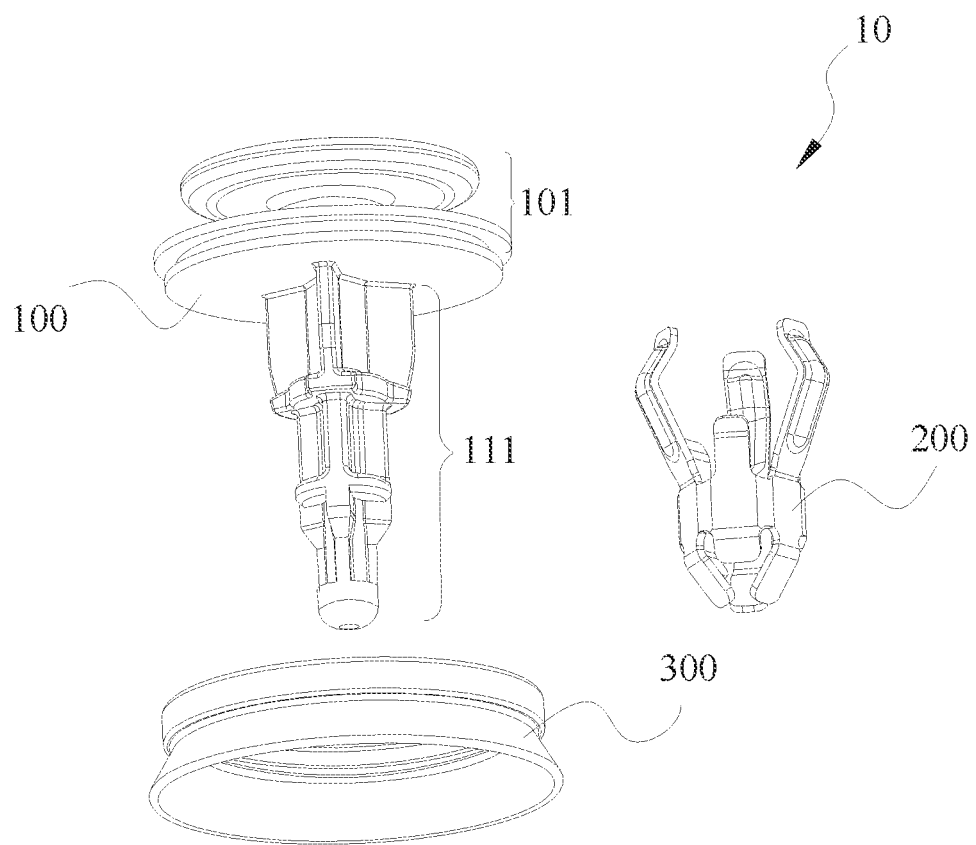
FIG. 2 is an exploded view of the fastener in FIG. 1.

FIG. 1 is a perspective view of a fastener 10 according to an embodiment of the present application. FIG. 2 is an exploded view of the fastener 10 in FIG. 1. As shown in FIGS. 1 and 2, the fastener 10 comprises a main body 100 and a retaining member 200. The main body 100 comprises a head 101 and a shaft portion 111 extending from the head 101, and the retaining member 200 is removably assembled on the shaft portion 111 of the main body 100. The main body 100 is made of a first material, and the retaining member 200 is made of a second material that is more wear-resistant than the first material. In some embodiments, the first material is plastic, and the second material is metal. It should be understood that in other embodiments, the first material and the second material are other suitable materials. The fastener 10 further comprises a scaling ring 300 removably connected to the main body 100.

FIG. 3 is a schematic perspective view illustrating the fastener 10 in FIG. 1 connecting a first component 20 and a second component 30. As shown in FIG. 3, the head 101 of the main body 100 of the fastener 10 is connected to the first component 20, and the retaining member 200 assembled on the shaft portion 111 of the main body 100 passes through a circular hole 31 (shown in FIG. 8) of the second component 30 to connect the second component 30 between the retaining member 200 and the head 101 of the main body 100.

Figure 4:
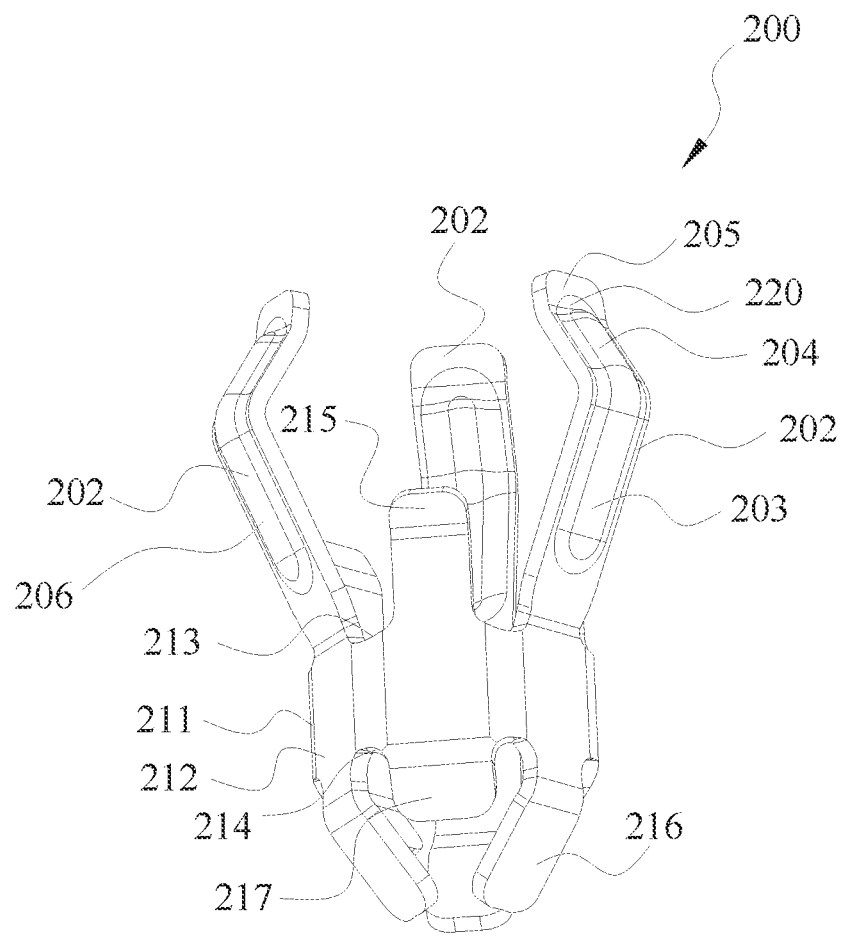
FIG. 4 is a perspective view of a retaining member of the fastener in FIG. 1 in a certain direction.

FIG. 4 is a perspective view of the retaining member 200 of the fastener 10 in FIG. 1 in a certain direction. The retaining member 200 comprises a receiving barrel 211 and three retaining arms 202. The receiving barrel 211 comprises a barrel body 212 having a hexagonal cross-section. The receiving barrel 211 comprises three lower connecting legs 216, three guiding tabs 217 and three upper connecting legs 215. The three lower connecting legs 216 and the three guiding tabs 217 respectively extending downwardly from the six sides of the lower end 214 of the barrel body 212 are arranged alternately about the central axis of the barrel body 212, and extend obliquely inwardly towards the central axis of the barrel body 212. The three lower connecting legs 216 and the three guiding tabs 217 extend obliquely inwardly towards the central axis of the barrel body 212, such that when the fastener 10 is being inserted into the hole 31 of the second component 30, the retaining member 200 is guided to slide downwardly against the hole 31 to insert into the hole 31, that is, the retaining member 200 easily slides downwardly against the hole 31 to insert into the hole 31. The three upper connecting legs 215 extend vertically upwardly from three sides of the upper end 213 of the barrel body 212 and are arranged about the central axis of the barrel body 212. The three upper connecting legs 215 and the three guiding tabs 217 respectively extend upwardly and downwardly from opposite sides of the upper end 213 and the lower end 214 of the barrel body 212. In some embodiments, the ends of the upper connecting legs 215 are inclined away from the central axis of the barrel body 212 (as shown in FIG. 4). In other embodiments, the ends of the upper connecting legs 215 extend vertically upward.

The configuration of the three retaining arms 202 will be described with continuing to refer to FIG. 4. The three retaining arms 202 extending upwardly from the receiving barrel 211 are distributed about the central axis of the receiving barrel 211 (coincide with the central axis of the barrel body 212), and are configured as deflectable towards the central axis of the receiving barrel 211. The three retaining arms 202 and the three upper connecting legs 215 are alternately arranged about the central axis of the barrel body 212. The retaining arms 202 each has a substantially V shape such that each of the retaining arms 202 has a lower portion 203 and an upper portion 204. The lower portions 203 extend obliquely away from the central axis of the barrel body 212 from the barrel body 212, and the upper portions 204 extend obliquely inwardly towards the central axis of the barrel body 212 from the lower portions 203. When the fastener 10 is connected to the second component 30, the retaining arms 202 are located between the shaft portion 111 of the main body 100 and the hole 31 of the second component 30, and the upper portions 204 abut against the hole 31 at a contact portion 220 (see FIG. 8), so as to retain the second component 30 between the head 101 of the main body 100 and the retaining arms 202 of the retaining member 200. The upper portions 204 are bent outwardly to form limiting stops 205 which retain the upper portions 204 in the hole 31 when the fastener 10 is connected to the second component 30. As shown in FIG. 4, each retaining arm 202 has an arcuate protrusion 206 on the outer surface thereof, which cooperates with a surface of the hole 31 to enable the retaining arm 202 to easily slide against the hole 31 so as to facilitate inserting or pulling out the fastener 10 into/from the hole 31 in the process of inserting or pull out the fastener 10 into/from the hole 31 of the second component 30.

Although it is showed in the figures that the barrel body 212 of the receiving barrel 211 has a hexagonal cross-section, and correspondingly having three upper connecting legs 215, three lower connecting legs 216, three guiding tabs 217 and three retaining arms 202, in some embodiments, the barrel body 212 is designed to have cross-sections of other shapes, and having different numbers of upper connecting legs 215, lower connecting legs 216, guiding tabs 217 and retaining arms 202 that extend from the barrel body 212.

Figure 5:
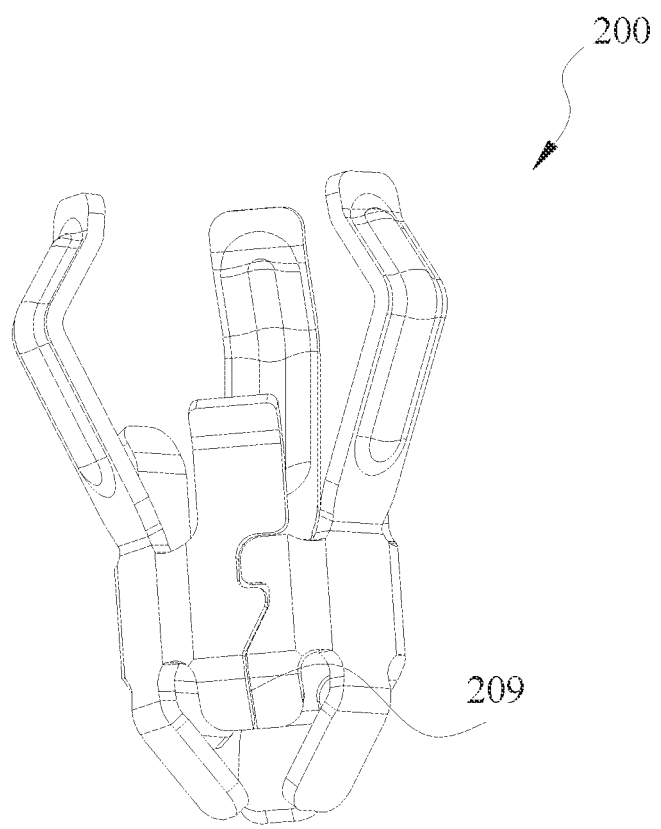
FIG. 5 is a perspective view of the retaining member in FIG. 4 in another direction.

FIG. 5 shows a perspective view of the retaining member 200 in FIG. 4 in another direction. As shown in FIG. 5, the receiving barrel 211 has a discontinuity 209 which enables the receiving barrel 211 to expand in the radial direction of the receiving barrel 211, allowing the shaft portion 111 of the main body 100 to be easily inserted into the receiving barrel 211. The discontinuity 209 also allows that, in some embodiments of manufacturing the retaining member 200, the sheet-shaped retaining member 200 is first manufactured, and the sheet-shaped retaining member 200 is then rolled to have a barrel shape as shown in the figures of the present application. After the sheet-shaped retaining member 200 is rolled to have the barrel shape, the discontinuity 209 is formed between the two ends of the sheet-shaped retaining member 200. Such an implementation makes it easy to manufacture the retaining member 200.

Figure 6:
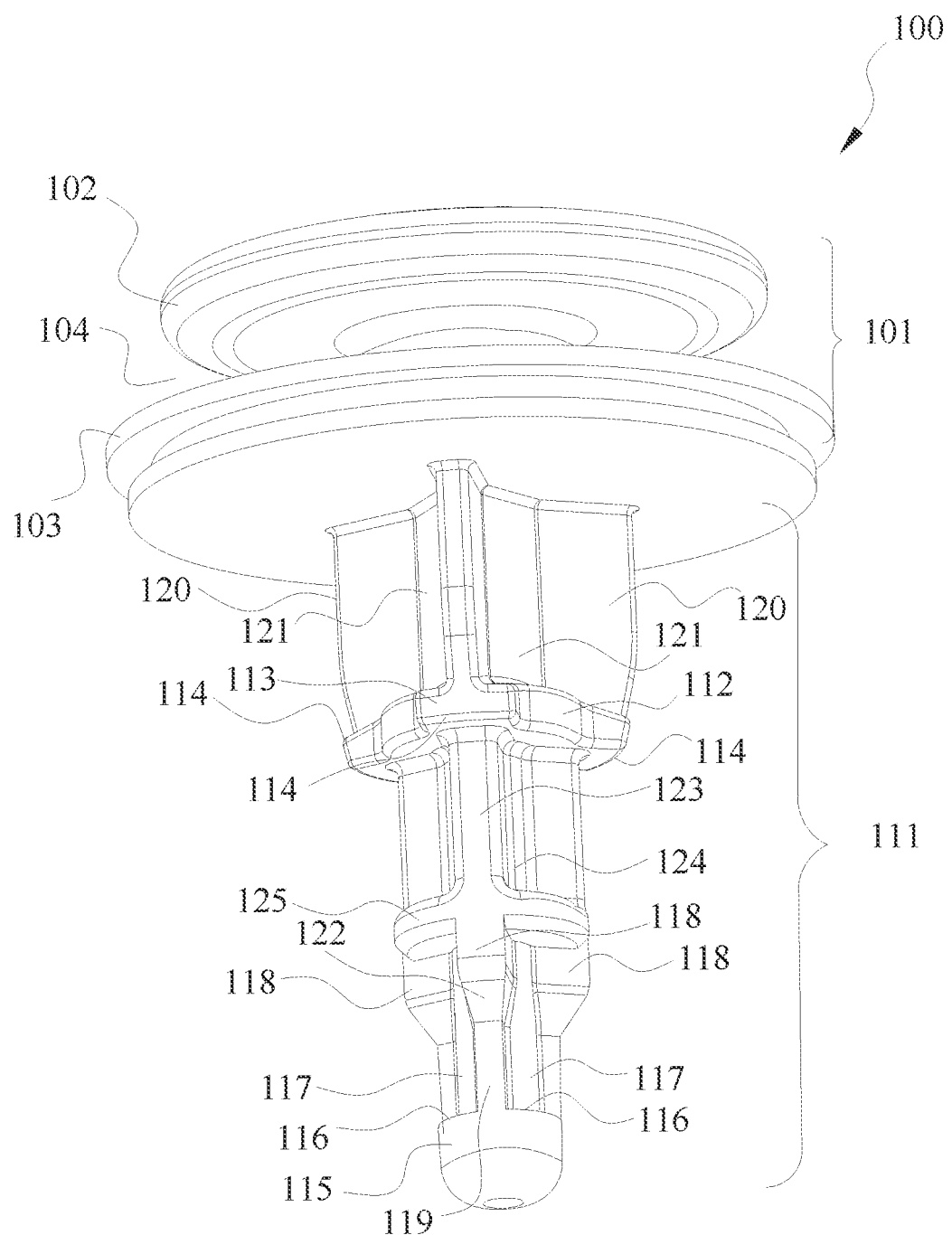
FIG. 6 is a perspective view of a main body of the fastener in FIG. 1.

FIG. 6 is a perspective view of the main body 100 of the fastener 10 in FIG. 1. As shown in FIG. 6, the head 101 of the main body 100 comprises a disk 102 and a disk 103 that are connected to each other. The disk 103 is located under the disk 102, facing the disk 102, and is spaced apart from the disk 102 by a gap 104. The first component 20 has an opening (not shown in the figure) that cooperates with the connection of the disk 102 and the disk 103 such that the first component 20 can be connected between the disk 102 and the disk 103. When the fastener 10 is connected to the first component 20, the first component 20 is connected to the head 101 with being retained in the gap 104. When the fastener 10 is further connected to the second component 30, the first component 20 and the second component 30 are connected by means of the fastener 10. The sealing ring 300 wraps the periphery of the disk 103 and extends beyond the lower surface of the disk 103. When the fastener 10 is connected to the second component 30, the sealing ring 300 abuts against the upper surface of the second component 30 to form a seal (refer to FIGS. 1 and 8).

Continuing to refer to FIG. 6, the shaft portion 111 extends from the disk 103. The shaft portion 111 comprises a shaft body 112. The outer diameter of a portion of the shaft body 112 received in the barrel body 212 matches the inner diameter of the barrel body 212. The shaft body 112 is provided with an upper stop structure 113 and a lower stop structure 115. The upper stop structure 113 is spaced apart from the disk 103 by a certain distance. The lower stop structure 115 is located below the upper stop structure 113, facing the upper stop structure 113, and is spaced apart from the upper stop structure 113 by a certain distance. When the retaining member 200 is assembled on the main body 100, the shaft portion 111 of the main body 100 passes through the receiving barrel 211 and is connected to the receiving barrel 211 to limit the axial and radial movements of the retaining member 200 along the shaft portion 111 relative to the main body 100. Specifically, when the retaining member 200 is assembled on the main body 100, the receiving barrel 211 cooperates with the upper stop structure 113 and the lower stop structure 115 to limit the axial movement of the retaining member 200 along the shaft portion 111 relative to the main body 100. Moreover, the receiving barrel 211 cooperates with a portion of the shaft portion 111 located between the upper stop structure 113 and the lower stop structure 115 to limit the radial movement of the retaining member 200 along the shaft portion 111 relative to the main body 100. The receiving barrel 211 can cooperate with the portion of the shaft portion 111 located between the upper stop structure 113 and the lower stop structure 115 to limit the radial movement of the retaining member 200 along the shaft portion 111 relative to the main body 100.

Further, as shown in FIG. 6, the upper stop structure 113 comprises three upper stop bosses 114 respectively formed by three protrusions arranged about the central axis of the shaft portion 111 and protruding outwardly from the shaft body 112. The shaft portion 111 comprises three lower recesses 117 arranged about the central axis of the shaft portion 111 and recessed inwardly from the shaft body 112. The lower stop structure 115 comprises three lower stop bosses 116 respectively formed by three lower recesses 117.

When the retaining member 200 is assembled on the main body 100, the three upper connecting legs 215 of the retaining member 200 respectively abut against the three upper stop bosses 114, and the three lower connecting legs 216 of the retaining member 200 respectively abut against the three lower stop bosses 116, and thus the axial movement of the retaining member 200 along the shaft portion 111 relative to the main body 100 is limited. Since the three lower connecting legs 216 of the retaining member 200 extend obliquely inwardly towards the central axis of the barrel body 212, when the retaining member 200 are moving downwardly along the shaft portion 111 relative to the main body 100, the three lower connecting legs 216 are further bent upwardly so as to increase the contact areas between the lower connecting legs 216 and the corresponding lower stop bosses 116, and thus the downward movement of the retaining member 200 along the shaft portion 111 relative to the main body 100 can be better limited. In an embodiment in which the ends of the three upper connecting legs 215 are bent outwardly, when the retaining member 200 are moving upwardly along the shaft portion 111 relative to the main body 100, surface contacts can be formed between the three upper connecting legs 215 and the corresponding upper stop bosses 114, and thus the upward movement of the retaining member 200 along the shaft portion 111 relative to the main body 100 can be better limited.

In addition, as shown in FIG. 6, when the retaining member 200 is assembled on the main body 100, the three lower connecting legs 216 of the retaining member 200 are respectively at least partially received by the three lower recesses 117. Further, as shown in FIG. 6, the lower ribs 118 are formed between adjacent lower recesses 117. The configuration that the three lower connecting legs 216 of the retaining member 200 are respectively at least partially received by the three lower recesses 117 enables the lower ribs 118 to stop the corresponding lower connecting legs 216 received in the three lower recesses 117 in the radial direction of the shaft portion 111, which is thus conductive to limiting the radial movement of the retaining member 200 along the shaft portion 111 relative to the main body 100. Moreover, the configuration that the three lower connecting legs 216 of the retaining member 200 are respectively at least partially received by the three lower recesses 117 allows the three lower connecting legs 216 to remain extending obliquely inwardly towards the central axis of the barrel body 212 when the retaining member 200 is assembled to the main body 100. Accordingly, when the fastener 10 is being inserted into the hole 31 of the second component 30, the three lower connecting legs 216 guide the retaining member 200 to slide downwardly against the hole 31 to insert into the hole 31.

Further referring to FIG. 6, the lower portions of the lower rib 118 has a cut portion 119 which comprises an inclined cutting surface 122 extending obliquely inwardly towards the central axis of the shaft portion 111. The inclined cutting surfaces 122 are configured to match the guiding tabs 217 of the retaining member 200. In this connection, when the retaining member 200 is assembled to the main body 100, the guiding tabs 217 remain extending obliquely inwardly towards the central axis of the barrel body 212 with abutting against the corresponding inclined cutting surfaces 122. Accordingly, when the fastener 10 is being inserted into the hole 31 of the second component 30, the guiding tabs 217 guides the retaining member 200 to slide downwardly against the hole 31 to insert into the hole 31. In addition, the configuration that the guiding tabs 217 abut against the corresponding inclined cutting surfaces 122 is also conductive to limiting the radial movement of the retaining member 200 along the shaft portion 111 relative to the main body 100.

In the embodiment shown in FIG. 6, the three lower recesses 117 extend upwardly from the lower stop bosses 116 by part of the length of the shaft portion 111, such that the upper ends of the three lower recesses 117 define the boss 125 between the upper stop structure 113 and the lower stop structure 115. The shaft portion 111 further comprises three middle recesses 124 respectively aligned with the three lower recesses 117 and extending from the boss 125 to the position where the upper stop structure 113 is located. The lower rib 118 are formed between the adjacent lower recesses 117, and the middle ribs 123 are formed between adjacent middle recesses 124. In the embodiment shown in FIG. 6, the middle rib are 123 are aligned to and connected to the lower ribs 118. In other embodiments, the middle ribs 123 are not aligned to and not connected to the lower ribs 118. In the embodiment shown in FIG. 6, the diameter of the boss 125, the diameter of the circumscribed circle of the three middle ribs 123 and the diameter of the circumscribed circle of the uncut portions of the three lower ribs 118 are all equal to the diameter of the shaft body 112. When the retaining member 200 is assembled on the main body 100, the barrel body 212 wraps the boss 125, portions of the middle ribs 123 and the uncut portions of the lower ribs 118, and the upper connecting legs 215 abut against portions of the corresponding middle ribs 123. Such configuration is conductive to limiting the axial and radial movements of the retaining member 200 along the shaft portion 111 relative to the main body 100. In the embodiment shown in the figures, the three lower ribs 118 are connected to the boss 125 and the corresponding three lower stop bosses 116, and the three middle ribs 123 are connected to the boss 125 and the shaft body 112 at the position where the corresponding three upper stop bosses 114 are located, so that the three middle ribs 123 and the three lower ribs 118 are conductive to strengthening the structure of the main body 100. In some embodiments, the three middle ribs 123 are not connected to the boss 125 and the shaft body 112 at the position where the corresponding three upper stop bosses 114 are located, and the three lower ribs 118 are not connected to the boss 125 and the corresponding three lower stop bosses 116.

The shaft portion 111 further comprises three upper ribs 120 located above the upper stop structure 113 and three receiving recesses 121 formed between the adjacent ones of the upper ribs 120. The three upper ribs 120 are arranged about the central axis of the shaft portion 111 and are configured to cooperate with the hole 31 of the second component, such that the three upper ribs 120 center the fastener 10 in the hole 31 when the fastener 10 is connected to the second component 30. In the embodiment shown in the figures, the three upper ribs 120 are configured to have a circumscribed circle having a diameter slightly less than the diameter of the hole 31. In this way, the three upper ribs 120 center the fastener 10 in the hole 31. As shown in the figures, the three upper ribs 120 are aligned to the three middle ribs 123 and the three lower ribs 118, respectively, and the three receiving recesses 121 are aligned to the three middle recesses 124 and the three lower recesses 117, respectively. In other embodiments, the three upper ribs 120 are not aligned to the corresponding middle ribs 123 and the corresponding lower ribs 118, and the three receiving recesses 121 are not aligned to the corresponding middle recesses 124 and the lower recesses 117.

When the retaining member 200 is assembled on the main body 100, the three elastic arms 202 of the retaining member 200 are respectively located outside of the corresponding middle recesses 124 and the receiving recesses 121. Since the three elastic arms 202 are located outside of the corresponding receiving recesses 121, the three receiving recesses 121 provide spaces for the corresponding retaining arms 202 to be defected towards the shaft portion 111, such that the three retaining arms 202 can be deflected towards the shaft portion 111 and received by the corresponding receiving recesses 121 when the fastener 10 is being inserted into the hole 31 of the second component 30. Meanwhile, the middle recesses 124 are also conductive to preventing the shaft portion 111 from interfering with the deflection of the three elastic arms 202 towards the shaft portion 111. In the embodiment shown in FIG. 6, the three upper ribs 120 are connected to the upper stop bosses 114 and the lower disk 103 to strengthen the structure of the main body 100. In some embodiments, the three upper ribs 120 are disposed between the upper stop bosses 114 and the lower disk 103, but are not connected to the corresponding upper stop bosses 114 and the lower disk 103. Furthermore, although it is shown in the figures that three lower stop bosses 116, three lower recesses 117, three lower ribs 118, three middle recesses 124, three middle ribs 123, three upper stop bosses 114, three upper ribs 120 and three receiving recesses 121 are provided, in other embodiments, the shaft portion 111 is configured to have different numbers of these structures so as to match the barrel bodies 212 having different cross-sectional shapes.

Figure 7:
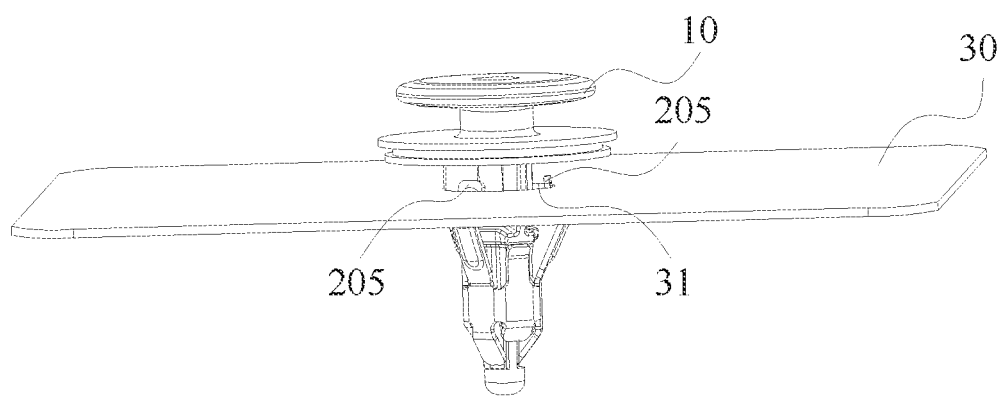
FIG. 7 is a schematic perspective view illustrating the fastener in FIG. 1 connected to the second component.
Figure 8:
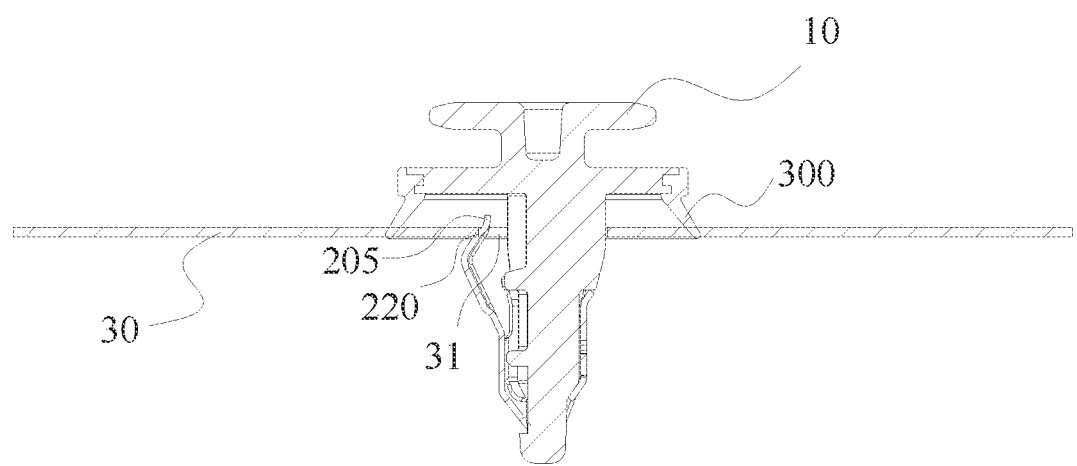
FIG. 8 is a schematic sectional view illustrating the fastener in FIG. 1 connected to the second component, with the section passing through a retaining arm of the retaining member.

FIG. 7 is a schematic perspective view illustrating the fastener 10 in FIG. 1 connected to the second component 30. For the purpose of clearly showing the cooperation between the retaining arms 202 and the hole 31 of the second component 30, the sealing ring 300 is not shown in FIG. 7. FIG. 8 is a schematic sectioned view illustrating the fastener 10 in FIG. 1 connected to the second component 30, with the section passing through one retaining arm 202 of the retaining member 200. With reference to FIGS. 7 and 8, the connecting and disconnecting of the fastener 10 and the second component 30 are described.

The diameter of the hole 31 of the second component 30 is greater than the outer diameter of the barrel body 212 of the retaining member 200, such that the barrel body 212 of the fastener 10 and the structures below the barrel body 212 can pass through the hole 31. After the barrel body 212 is inserted through the hole 31, the lower portions 203 of the retaining arms 202 come into contact with the hole 31 and slide downwardly against the hole 31 as the fastener 10 is being further inserted into the hole 31. In this process, the retaining arms 202 are subjected to a force towards the shaft portion 111, causing the retaining arms 202 to be deflected towards the shaft portion 111 from their initial positions, so that the fastener 10 can continue to be inserted downwardly. When the connections of the lower portions 203 and the upper portions 204 of the retaining arms 202 abut against the hole 31, the retaining arms 202 deflect the maximum towards the shaft portion 111. As the fastener 10 continues to be inserted downwardly, the upper portions 204 of the retaining arms 202 come into contact with the hole 31 and slide downwardly against the hole 31. Thus, the retaining arms 202 are gradually deflected away from the shaft portion 111 towards their initial positions. When the fastener 10 is inserted downwardly to the extent that the sealing ring 300 of the fastener 10 abuts against the second component 30, the fastener 10 is inserted into the hole 31 in place. At this moment, the retaining arms 202 at least partially return to their initial positions, and the retaining arms 202 are located between the shaft portion 111 and the hole 31 with the contact portions 220 on the upper portions 204 of the retaining arms 202 abut against the hole 31. Also at this moment, the limiting stops 205 at the ends of the upper portions 204 of the retaining arms 202 extend beyond the upper surface of the hole 31, such that the limiting stops 205 can retain the upper portions 204 in the hole 31. Thus, the second component 30 is connected to the fastener 10.

The fastener 10 can be pulled upwardly when it is necessary to disconnect the fastener 10 from the second component 30. When the fastener 10 is being pulled upwardly, the upper portions 204 of the retaining arms 202 slide upwardly against the hole 31, and the retaining arms 202 are subjected to the force towards the shaft portion 111 so as to be deflected towards the shaft portion 111. When the fastener 10 is pulled upwardly to the extent that the connections of the lower portions 203 and the upper portions 204 of the retaining arm 202 abut against the hole 31, the retaining arms 202 deflect the maximum towards the shaft portion 111. As the fastener 10 continues to be pulled upwardly, the lower portions 203 of the retaining arms 202 reach contact with the hole 31 and slide upwardly against the hole 31. Then, as the lower portions 203 of the retaining arms 202 slide upwardly against the hole 31, the retaining arms 202 are gradually deflected away from the shaft portion 111 towards their initial positions. When the lower portions 203 slide upwardly to the extent that the retaining arms 202 leave the hole 31, the retaining arms 202 return to their initial positions. The fastener 10 is removed from the hole 31 with being further pulled upwardly. Thus, the second component 30 is disconnected from the fastener 10.

Although the retaining arms of the retaining member 200 slide against the hole 31 in the process of inserting and pulling out the fastener 10 into/from the hole 31 of the second component 30, the retaining arms 202 are not easily to be cut since the retaining member 200 is made of a wear-resistant material. Therefore, the fastener 10 according to the present application can still maintain a strong fastening to the connected second component 30 so as to stably connect the first component 20 and the second component 30 after multiple insertions into and pulls out of the hole 31 of the second component 30.

The present application offers at least the following technical effects. First, since the fastener is composed of two portions, the retaining member 200 can be made of a more wear-resistant material. Therefore, the retaining arms 202 are less prone to be cut when the fastener 10 is being inserted into the hole 31 of the second component 30. Therefore, the fastener 10 according to the present application can still maintain a strong fastening to the connected second component 30 after multiple insertions into and pulls out of the hole 31 of the second component 30. Second, the configuration of the main body 100 and the retaining member 200 of the fastener 10 enables the fastener 10 to securely connect the second component 30. Finally, the configuration of the main body 100 and the retaining member 200 of the fastener 10 enables the main body 100 and the retaining member 200 to be securely connected to each other.

Although the present application is described with reference to the examples of embodiments outlined above, various alternatives, modifications, variations, improvements and/or substantial equivalents, which are known or anticipated at present or to be anticipated before long, may be obvious to those of at least ordinary skill in the art. Furthermore, the technical effects and/or technical problems described in this description are exemplary rather than limiting. Therefore, the disclosure in this description may be used to solve other technical problems and have other technical effects and/or may solve other technical problems. Accordingly, the examples of the embodiments of the present disclosure as set forth above are intended to be illustrative rather than limiting. Various changes may be made without departing from the spirit or scope of the present disclosure. Therefore, the present disclosure is intended to embrace all known or earlier disclosed alternatives, modifications, variations, improvements and/or substantial equivalents.

What is claimed is:

1. A fastener for fastening a first component in a second component having a circular hole, the fastener comprising:
   a main body comprising a head configured to connect the first component and a shaft portion extending from the head; and
   a retaining member comprising a receiving barrel and a plurality of retaining arms extending upwardly from the receiving barrel and distributed about a central axis of the receiving barrel, the shaft portion passing through and connected to the receiving barrel to limit axial and radial movement of the retaining member along the shaft portion relative to the main body, the plurality of retaining arms being configured to be deflectable toward the shaft portion, wherein the plurality of retaining arms and the shaft portion are configured such that the plurality of retaining arms are located between the shaft portion and the hole and abut against the hole to hold the second component between the head and the plurality of retaining arms when the retaining member is inserted into the hole;
   wherein the main body is made of a first material and the retaining member is made of a second material that is more wear-resistant than the first material.

2. The fastener according to claim 1, wherein the first material is plastic and the second material is metal.

3. The fastener according to claim 2, wherein the retaining member is removably assembled on the main body.

4. The fastener according to claim 1,
   wherein the shaft portion comprises a shaft body and an upper stop structure and a lower stop structure disposed on the shaft body, wherein the upper stop structure is spaced apart from the head, and the lower stop structure is located below the upper stop structure with facing the upper stop structure and being spaced apart from the upper stop structure; and
   wherein the receiving barrel of the retaining member cooperates with the upper stop structure and the lower stop structure to limit the axial movement of the retaining member along the shaft portion relative to the main body, and wherein the receiving barrel cooperates with the portion of the shaft portion between the upper stop structure and the lower stop structure to limit the radial movement of the retaining member along the shaft portion relative to the main body.

5. The fastener according to claim 4, wherein the receiving barrel comprises a barrel body, wherein an outer diameter of the portion of the shaft body received in the barrel body matches an inner diameter of the barrel body.

6. The fastener according to claim 5, wherein
   the receiving barrel further comprises a plurality of upper connecting legs extending from an upper end of the barrel body and arranged about a central axis of the barrel body, and the plurality of upper connecting legs and the plurality of retaining arms are arranged alternately about the central axis of the barrel body; and
   the shaft portion further comprises a plurality of protrusions arranged about the central axis of the shaft portion and protruding outwardly from the shaft body, and the upper stop structure comprises a plurality of upper stop bosses respectively formed by the plurality of protrusions;
   wherein the plurality of upper connecting legs respectively abut against the plurality of upper stop bosses.

7. The fastener according to claim 6, wherein
   the receiving barrel further comprises a plurality of lower connecting legs extending from a lower end of the barrel body and arranged about the central axis of the barrel body, and the plurality of lower connecting legs extend inwardly obliquely towards the central axis of the barrel body; and
   the shaft portion further comprises a plurality of lower recesses arranged about the central axis of the shaft portion and recessed inwardly from the shaft body, and the lower stop structure comprises a plurality of lower stop bosses respectively formed by the plurality of lower recesses;
   wherein the plurality of lower connecting legs respectively abut against the plurality of lower stop bosses, and the plurality of lower connecting legs are respectively at least partially received by the plurality of lower recesses.

8. The fastener according to claim 7, wherein the receiving barrel further comprises a plurality of guiding tabs extending from the lower end of the barrel body and arranged about the central axis of the barrel body, the plurality of guiding tabs extending inwardly obliquely towards the central axis of the barrel body, and the plurality of guiding tabs and the plurality of lower connecting legs being alternately arranged about the central axis of the barrel body.

9. The fastener according to claim 8, wherein the barrel body has a hexagonal cross section, and the receiving barrel comprises three lower connecting legs, three guiding tabs, three upper connecting legs and three retaining arms, wherein the three lower connecting legs and the three guiding tabs respectively extend downwardly from six sides of the barrel body, and the three upper connecting legs and the three retaining arms respectively extend upwardly from the six sides of the barrel body.

10. The fastener according to claim 8, wherein the receiving barrel has a break enabling the receiving barrel to expand in the radial direction of the receiving barrel.

11. The fastener according to claim 8,
    wherein the shaft portion comprises a plurality of upper ribs located above the upper stop structure, and the plurality of upper ribs being arranged about the central axis of the shaft portion and cooperating with the hole to center the fastener in the hole; and
    wherein the shaft portion further comprises a plurality of receiving recesses formed between adjacent ones of the plurality of upper ribs, and the plurality of receiving recesses are configured to respectively receive the plurality of retaining arms when the plurality of retaining arms are deflected towards the shaft portion.

12. The fastener according to claim 11, wherein
    the plurality of retaining arms have a substantially V shape such that each of the plurality of retaining arms has a lower portion extending obliquely away from the central axis of the barrel body from the barrel body and an upper portion extending obliquely inwardly toward the central axis of the barrel body from the lower portion, and the upper portion has a contact portion for abutting against the hole.

13. The fastener according to claim 12, wherein the end of the upper portion is bent outwardly to form a limiting stop retaining the upper portion in the hole.

14. The fastener according to claim 13, wherein the plurality of retaining arms have arcuate protrusions on outer surfaces thereof.

\* \* \* \* \*